US011978401B1

(12) United States Patent
Wang et al.

(10) Patent No.: US 11,978,401 B1
(45) Date of Patent: May 7, 2024

(54) DISPLAY PANEL AND DRIVING METHOD THEREOF AND DISPLAY APPARATUS

(71) Applicant: Wuhan Tianma Microelectronics Co., Ltd., Wuhan (CN)

(72) Inventors: Shanglong Wang, Wuhan (CN); Tianchun Zheng, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/108,034

(22) Filed: Feb. 10, 2023

(30) Foreign Application Priority Data

Oct. 31, 2022 (CN) ......................... 202211348982.4

(51) Int. Cl.
*G09G 3/3233* (2016.01)

(52) U.S. Cl.
CPC ... *G09G 3/3233* (2013.01); *G09G 2320/0233* (2013.01); *G09G 2320/0242* (2013.01)

(58) Field of Classification Search
None
See application file for complete search history.

(56) References Cited

U.S. PATENT DOCUMENTS

2017/0316735 A1* 11/2017 Ohara .................. G09G 3/3291
2022/0102583 A1* 3/2022 Baumheinrich ...... H01L 27/156

FOREIGN PATENT DOCUMENTS

CN 108399895 A 8/2018
CN 112435628 A 3/2021
CN 111312158 B 11/2021

* cited by examiner

*Primary Examiner* — Stephen T. Reed
(74) *Attorney, Agent, or Firm* — East IP P.C.

(57) ABSTRACT

The embodiments of the application provide a display panel and a driving method thereof and a display apparatus. The display panel includes a first pixel circuit and first light emitting element. The first pixel circuit is electrically connected with M first light emitting elements which are connected in series, M and M is an integer. The first pixel circuit includes: a driving module configured to drive the first light emitting elements to emit light; and at least one first switch module connected in parallel with N first light emitting elements, 1≤N<M and N is a positive integer.

20 Claims, 10 Drawing Sheets

DISPLAY PANEL AND DRIVING METHOD THEREOF AND DISPLAY APPARATUS

CROSS REFERENCE TO RELATED APPLICATION

This application claims priority to Chinese Patent Application No. 202211348982.4, filed on Oct. 31, 2022, which is hereby incorporated by reference in its entirety.

TECHNICAL FIELD

The present application relates to a field of display technology, and particularly to a display panel and a driving method thereof and a display apparatus.

BACKGROUND

The Organic Light Emitting Diode (OLED) is more and more widely used in the display field because of its advantages of active light emitting, visual angle, fast response, wide color gamut and low power consumption.

However, the inventor of the application has found that the OLED display panel can have a color deviation or a color offset, when displaying at low brightness, and there is a problem of poor display effect.

SUMMARY

The embodiments of the present application provide a display panel and a driving method thereof and a display apparatus.

In a first aspect, the embodiments of the present application provide a display panel including a first pixel circuit and first light emitting elements, wherein the first pixel circuit is electrically connected with M first light emitting elements which are connected in series, M≥2 and M is an integer, and the first pixel circuit includes: a driving module configured to drive the first light emitting elements to emit light; and at least one first switch module connected in parallel with N first light emitting elements, 1≤N<M and N being an integer.

In a second aspect, the embodiments of the present application provide a driving method of display panel, wherein the display panel includes a first pixel circuit and first light emitting elements, wherein the first pixel circuit is electrically connected with M first light emitting elements which are connected in series, M≥2 and M is an integer, and the first pixel circuit includes: a driving module configured to drive the first light emitting elements to emit light; and at least one first switch module connected in parallel with N first light emitting elements, 1≤N<M and N being an integer. The driving method of the display panel includes: providing, under a condition that a brightness of the display panel is less than a preset brightness threshold, a turn-on level to a control terminal of at least one of the at least one first switch module, to cause the first light emitting elements connected in parallel therewith not to emit light.

In a third aspect, the embodiments of the present application provide a display apparatus including a display panel, wherein the display panel includes a first pixel circuit and first light emitting elements, wherein the first pixel circuit is electrically connected with M first light emitting elements which are connected in series, M≥2 and M is an integer, and the first pixel circuit includes: a driving module configured to drive the first light emitting elements to emit light; and at least one first switch module connected in parallel with N first light emitting elements, 1≤N<M and N being an integer.

BRIEF DESCRIPTION OF THE DRAWINGS

In order to explain the technical solutions of the embodiments of the present application more clearly, the following briefly introduces the drawings that need to be used in the embodiments of the present application. For those ordinary skilled in the art, other drawings may further be obtained from these drawings without the exercise of inventive faculty.

DETAILED DESCRIPTION

Figure 1:
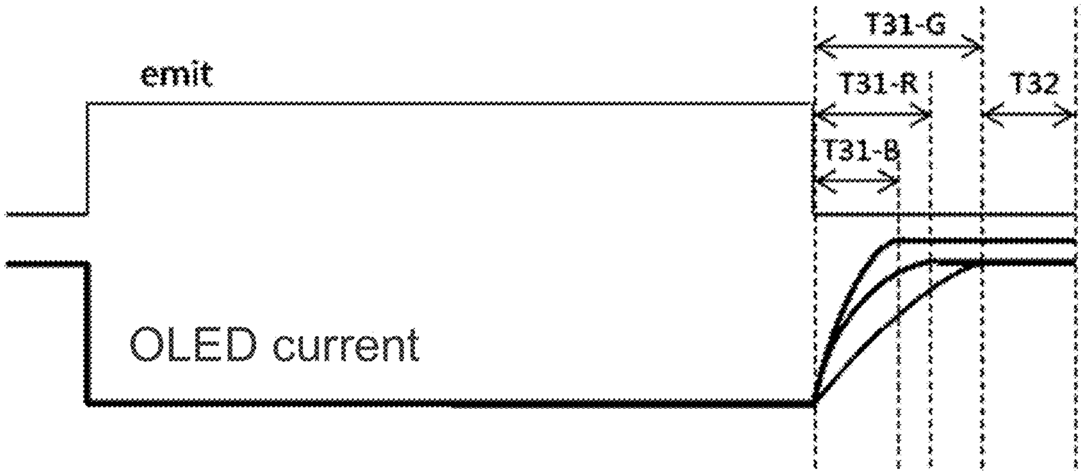
FIG. 1 is a schematic diagram of currents of light emitting elements of different colors in low brightness.

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only intended to explain the present application, and are not intended to limit the present application. It will be apparent to those skilled in the art that the present application may be practiced without some of these specific details. The following description of the embodiments is merely to provide a better understanding of the present application by illustrating examples of the present application.

It should be noted that, relational terms such as first and second herein are used only to distinguish one entity or operation from another entity or operation, and do not necessarily require or imply that any such relationship or sequence actually exists among these entities or operations. In addition, the terms “include”, “comprise” or any other variation thereof are intended to encompass non-exclusive inclusion, such that a process, method, article or device which includes a list of elements includes not only those elements, but also other elements which are not explicitly listed or elements inherent to such process, method, article or device. Without further limitation, an element defined by the phrase “include” does not preclude the presence of additional identical elements in the process, method, article, or device that includes the element.

It should be understood that the term “and/or” used in this document is only to describe an association relationship of associated objects, which indicates that there may be three kinds of relationships. For example, A and/or B may indicate three cases of A existing alone, A and B existing at the same time, and B existing alone. In addition, the character “/” herein generally indicates that related objects have an “or” relationship.

It should be noted that, a transistor in the embodiments of the present application may be an N-type transistor or a P-type transistor. For an N-type transistor, a turn-on level is a high level, and a turn-off level is a low level. That is, when a gate of the N-type transistor is at a high level, a connection between a first electrode and a second electrode thereof is turned on, and when the gate of the N-type transistor is at a low level, the connection between the first electrode and the second electrode thereof is turned off. For a P-type transistor, a turn-on level is a low level, and a turn-off level is a high level. That is, when a control electrode of the P-type transistor is at a low level, a connection between a first electrode and a second electrode thereof is turned on, and when the control electrode of the P-type transistor is at a high level, the connection between the first electrode and the second electrode thereof is turned off. In specific implementation, the gate of each transistor is used as the control electrode, and the first electrode of the transistor may be a source and the second electrode may be a drain, or the first electrode of the transistor may be the drain and the second electrode may be the source, dependent on a signal applied on the gate of the transistor and its type, which will not be distinguished herein. In addition, both of the turn-on level and the turn-off level in the embodiments of the present application have a general meaning, and the turn-on level refers to any level that may make the transistor turn on, and the turn-off level refers to any level that may make the transistor turn off.

In the embodiments of the present application, the term “electrical connection” may refer to a direct electrical connection between two components, or may refer to an electrical connection between the two components via one or more other components.

In the embodiments of the present application, a first node, a second node and a third node are only defined for the convenience of describing circuit structures, and the first node, the second node and the third node are not actual circuit units.

It will be apparent to those skilled in the art that various modifications and variations may be made in the present application without departing from the spirit or scope of the present application. Thus, the present application is intended to cover the modifications and variations of the present application that fall within the scope of the corresponding claims (claimed technical solutions) and their equivalents. It should be noted that the implementation manners provided by the embodiments of the present application may be combined with one another if there is no contradiction.

Before describing the technical solutions provided by the embodiments of the present application, in order to facilitate the understanding of the embodiments of the present application, the present application first specifically describes the problems existed in the prior art.

FIG. 1 is a schematic diagram of currents of light emitting elements of different colors in low brightness. As shown in FIG. 1, when a light emitting control signal emit is at a high level, a current of the light emitting elements is 0, and the light emitting elements do not emit light; and when the light emitting control signal emit is at a low level, first electrodes (e.g., anodes) of the light emitting elements will be gradually charged to their normal working levels, the currents of the light emitting elements will gradually reach their normal working currents, and the light emitting elements will emit light. However, the inventor of the present application found that the charging times of sub pixels of different colors are different, that is, the charging times of the light emitting elements of different colors are different, in a same gray scale, due to the different inherent attributes of device light emitting efficiency of the light emitting elements of different colors. For example, the charging time T31-R of a red light emitting element R and the charging time T31-B of a blue light emitting element B are less than the charging time T31-G of a green light emitting element G, resulting in different effective light emitting times of the light emitting elements of different colors. Especially when the driving current is small, the charging time T31-G of the green light emitting element G is relatively large, and the effective light emitting time T32 of the green light emitting element G is smaller than the effective light emitting times of the red light emitting element R and the blue light emitting element B, resulting in a color deviation or a color offset of the display panel.

In view of the above research findings of the inventor, the embodiments of the application provide a display panel and a driving method thereof and a display apparatus, which can solve the color deviation problem of the display panel in the related art.

The technical concept of the embodiments of the application is that: the first pixel circuit is simultaneously electrically connected with M first light emitting elements which are connected in series, the first pixel circuit includes at least one first switch module, the first switch module is connected in parallel with N first light emitting elements, $1 \leq N < M$ and N is a positive integer. When the first switch module is turned on, the first light emitting elements connected in parallel with the first switch module do not emit light due to short circuit, so that the light emitting area is decreased. As the light emitting area decreases, in order to realize an original desired brightness, the driving current of the first pixel circuit needs to be designed to be greater than an original value. As the driving current of the first pixel circuit increases, the difference in charging time among light emitting elements of different colors can be reduced, the problem of color deviation can be improved, and the display quality of the display panel can be improved.

The display panel provided by the embodiments of the application is described below.

Figure 2:
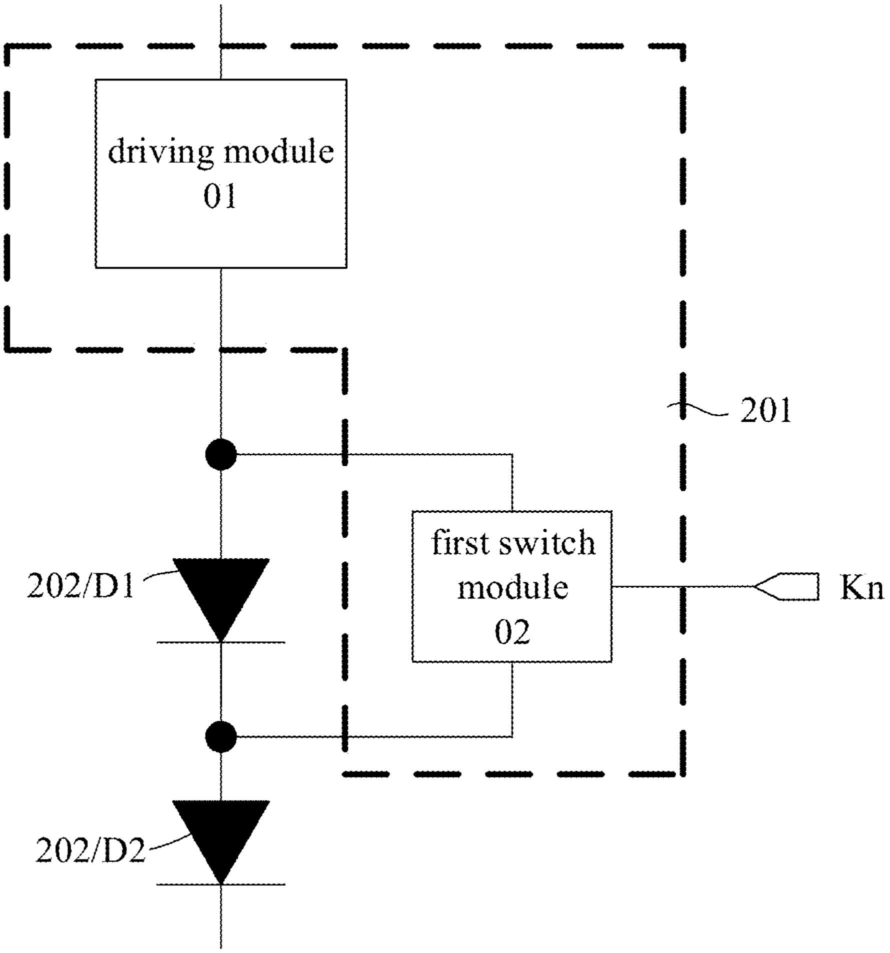
FIG. 2 is a schematic diagram of a circuit of a first pixel circuit and first light emitting elements in a display panel provided by the embodiments of the application.

FIG. 2 is a schematic diagram of a circuit of a first pixel circuit and first light emitting elements in a display panel provided by the embodiments of the application. As shown in FIG. 2, the display panel 20 may include a first pixel circuit 201 and first light emitting elements 202. By way of example, the first light emitting elements 202 may be OLEDs. The embodiments of the application do not limit the colors of the first light emitting elements 202, which may be any color. That is, a first light emitting element of any color may be applied to the circuit structure shown in FIG. 2. The first pixel circuit 201 is electrically connected with M first light emitting elements 202 which are connected in series, M and M is an integer. That is, one pixel circuit 201 may be connected in series with at least two first light emitting elements 202. It should be noted that in order to facilitate brightness and/or chromaticity adjustment, the colors of the M first light emitting elements 202 connected in series may be the same with one another.

The first pixel circuit 201 may include a drive module 01 and at least one first switch module 02. The drive module 01 may be configured to drive the first light emitting elements 202 to emit light. The first switch module 02 may be connected in parallel with N first light emitting elements 202, $1 \le N < M$ and N is a positive integer. That is, a part of the M first light emitting elements 202 connected in series are connected in parallel with the first switch module 02, and the other part of the first light emitting elements 202 are not connected in parallel with the first switch module 02.

When a brightness of the display panel is less than a preset brightness threshold, that is, when the brightness is low, the first switch module 02 may be turned on. Since the first switch module 02 is turned on, the turned-on first switch module 02 may be regarded as a wire with small resistance, and the first light emitting elements 202 connected in parallel with the first switch module 02 are short circuited. The first light emitting elements 202 which are not connected in parallel with the first switch module 02 may emit light, since the first light emitting elements 202 which are not connected in parallel with the first switch module 02 are not short circuited. However, since the first light emitting elements 202 connected in parallel with the first switch module 02 no longer emit light, the total light emitting area of the M first light emitting elements 202 are decreased. As the light emitting area decreases, in order to realize the original desired brightness, the driving current of the first pixel circuit needs to be designed to be greater than the original value. As the driving current of the first pixel circuit increases, the charging times of the first light emitting elements of different colors can be reduced, the difference in charging time among the first light emitting elements of different colors can be reduced, the problem of color deviation can be improved, and the display quality of the display panel can be improved.

Optionally, when the brightness of the display panel is greater than or equal to the preset brightness threshold, such as at high brightness, the first switch module 02 may be turned off, that is, all of the M first light emitting elements 202 connected in series emit light.

Figure 3:
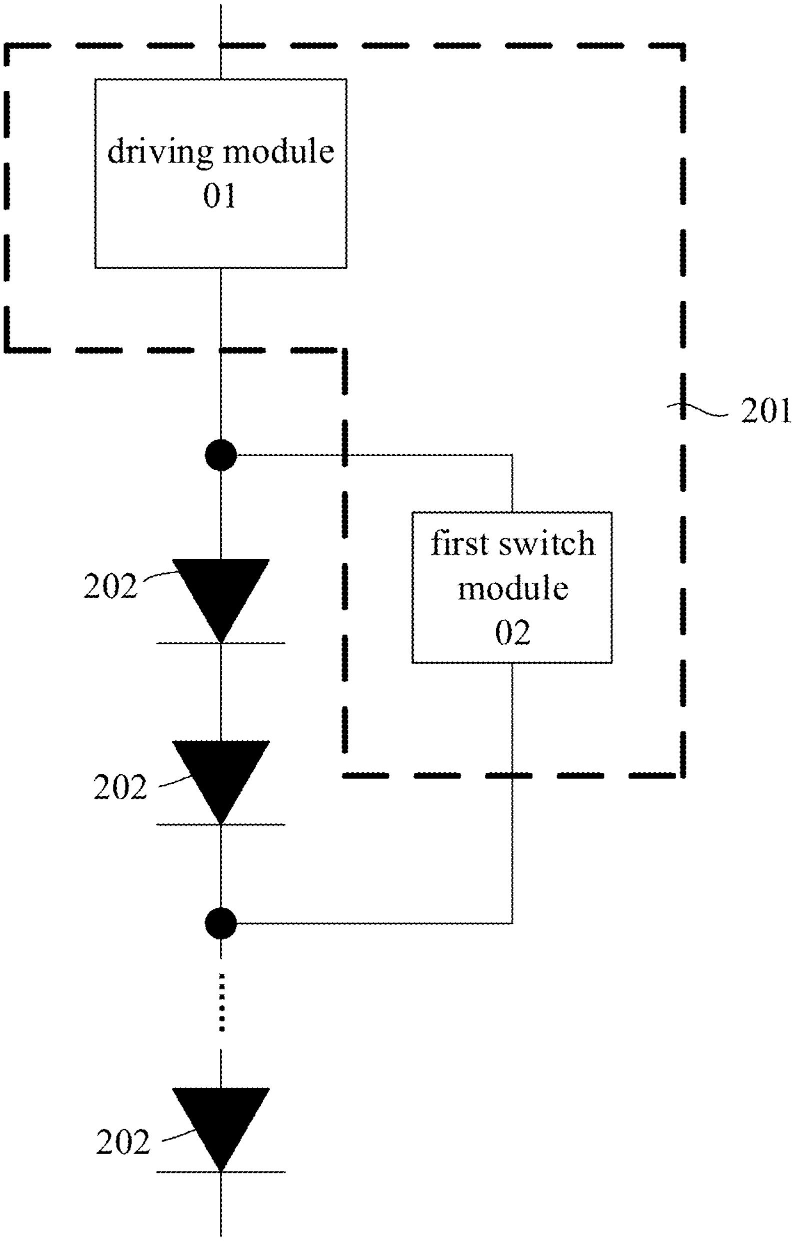
FIG. 3 is another schematic diagram of a circuit of a first pixel circuit and first light emitting elements in a display panel provided by the embodiments of the application.

FIG. 3 is another schematic diagram of a circuit of a first pixel circuit and first light emitting elements in a display panel provided by the embodiments of the application. As shown in FIG. 3, according to some embodiments of the present application, M may be greater than or equal to 3. That is, one pixel circuit 201 may be electrically connected with at least three first light emitting elements 202 which are connected in series. One first switch module 02 may be connected in parallel with at least two first light emitting elements 202 at the same time.

In this way, one first switch module 02 can control at least two first light emitting elements 202 to emit light/not emit light, which can reduce the number of first switch modules 02, save wiring space and reduce production costs.

Figure 4:
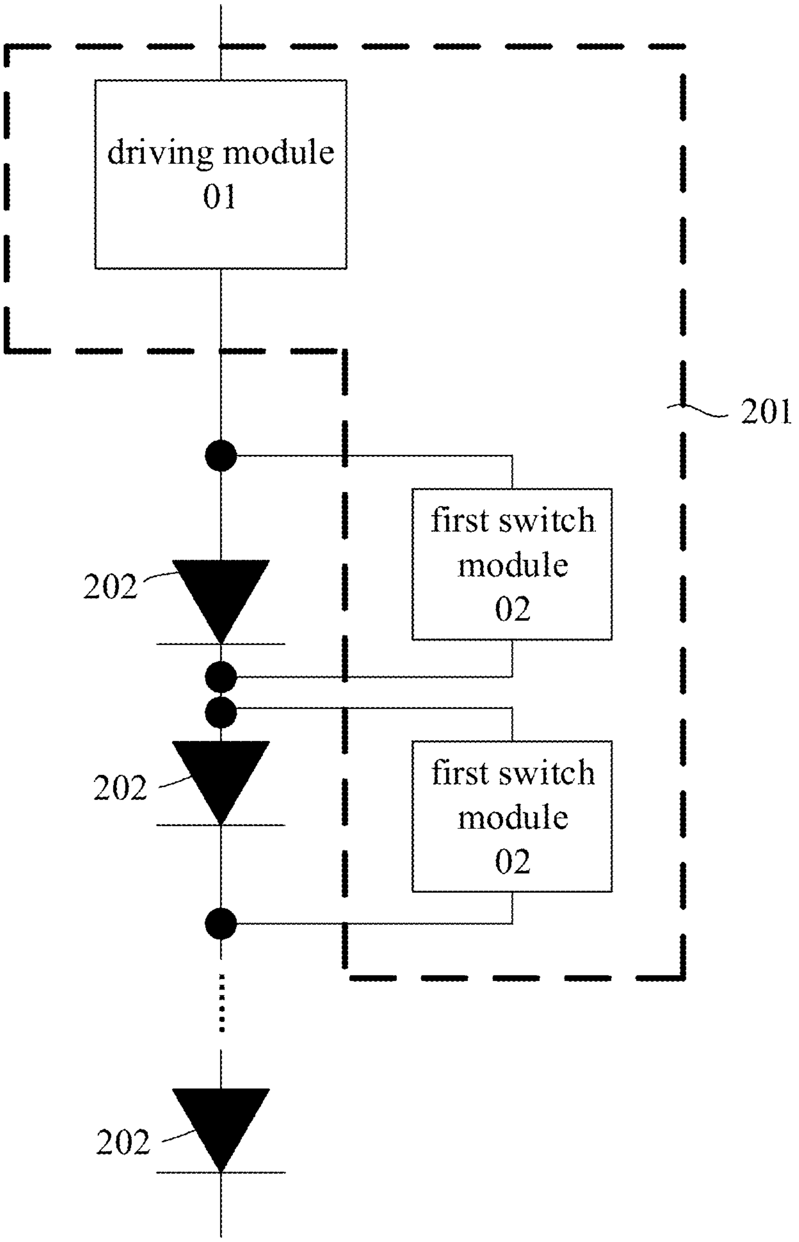
FIG. 4 is yet another schematic diagram of a circuit of a first pixel circuit and first light emitting elements in a display panel provided by the embodiments of the application.

FIG. 4 is yet another schematic diagram of a circuit of a first pixel circuit and first light emitting elements in a display panel provided by the embodiments of the application. As shown in FIG. 4, according to other embodiments of the application, the difference between the embodiments shown in FIG. 4 and FIG. 3 lies in that the first pixel circuit 201 may optionally include a plurality of first switch modules 02, which may be connected in parallel with different first light emitting elements 202 respectively. For example, each first switch module 02 is only connected in parallel with one first light emitting element 202. Optionally, each first switch module 02 may also be connected in parallel with two or more first light emitting elements 202. It should be noted that "a plurality of" in the present application represents two or more.

The preset brightness threshold may include a first brightness threshold and a second brightness threshold, and the second brightness threshold is less than the first brightness threshold. When the brightness of the display panel is less than the first brightness threshold and greater than or equal to the second brightness threshold, x1 first switch modules 02 in the first pixel circuit 201 are turned on, so that the first light emitting elements 202 in parallel with the x1 first switch modules 02 do not emit light. When the brightness of the display panel is less than the second brightness threshold, x2 first switch modules 02 in the first pixel circuit 201 are turned on, so that the first light emitting elements 202 in parallel with x2 first switch modules 02 do not emit light, $x2 > x1 > 0$, and each of x1 and x2 is an integer. The first brightness threshold and the second brightness threshold may be flexibly set according to the actual situation, which is not limited in the embodiments of the present application.

For example, when the brightness of the display panel is lower than 80 nit, only one first switch module 02 may be turned on, that is, only one first light emitting element 202 may be turned off; and when the brightness of the display panel is lower than 30 nit, two first switch modules 02 may be turned on, that is, the two first light emitting elements 202 may be turned off, and so on.

In this way, on the basis that the first switch module may short-circuit the first light emitting element connected in parallel with it, which results in that some of the first light emitting elements do not emit light, a more refined control may be realized, that is, the lower the brightness of the display panel is, the greater the number of the first light emitting elements 202 that are turned off is, and different degrees of color deviation adjustment may be realized.

It should be noted that in other embodiments, the preset brightness threshold is not only limited to the first brightness threshold and the second brightness threshold, but also can be divided into a larger number of thresholds, which may be flexibly adjusted according to the actual situation. The embodiments of the application do not limit this.

As shown in FIG. 2, one first switch module 02 may be connected in parallel with N first light emitting elements 202, $1 \le N < M$ and N is a positive integer. Specifically, a control terminal of the first switch module 02 may be electrically connected with a first control signal line Kn, a first terminal of the first switch module 02 may be electrically connected with a first electrode of a $1^{st}$ one of the N first light emitting elements 202, and a second terminal of the first switch module 02 may be electrically connected with a second electrode of a $N^{th}$ one of the N first light emitting elements 202. Among the N first light emitting elements 202 connected in series, a second electrode of a $i^{th}$ first light emitting element 202 is electrically connected with a first electrode of a $(i+1)^{th}$ first light emitting element 202, $1 \leq i \leq N-1$ and i is an integer.

In this way, the first control signal line Kn may control the turn-on/turn-off of the first switch module 02, thereby flexibly controlling the turn-on/turn-off of the first light emitting element 202 connected in parallel with the first switch module 02.

Figure 5:
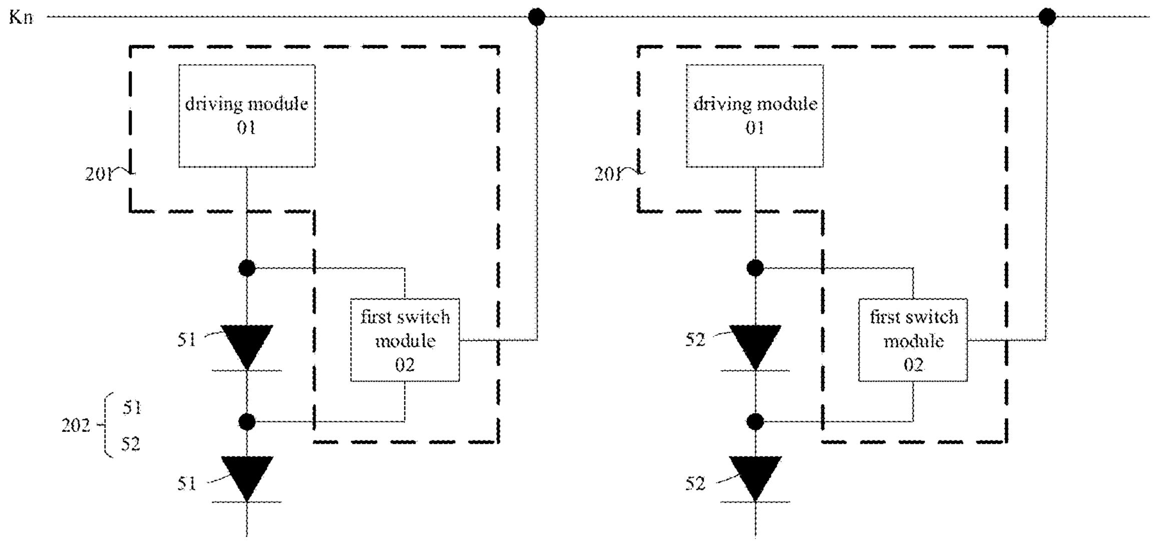
FIG. 5 is yet another schematic diagram of a circuit of a first pixel circuit and first light emitting elements in a display panel provided by the embodiments of the application.

FIG. 5 is yet another schematic diagram of a circuit of a first pixel circuit and first light emitting elements in a display panel provided by the embodiments of the application. As shown in FIG. 5, according to some embodiments of the present application, the first light emitting element 202 may optionally include a first-color first light emitting element 51 and a second-color first light emitting element 52. It should be noted that the first pixel circuit 201 connected to the first-color first light emitting element 51 and the first pixel circuit 201 connected to the second-color first light emitting element 52 are different. For example, the first-color first light emitting element 51 and the second-color first light emitting element 52 may be one of the red light emitting element, the green light emitting element and the blue light emitting element, respectively, with different colors from one another.

In the embodiment shown in FIG. 5, the first switch module 02 coupled with the first-color first light emitting element 51 and the first switch module 02 coupled with the second-color first light emitting element 52 may be connected to the same first control signal line Kn. That is, the same first control signal line Kn may be connected with the first switch modules 02 coupled with the first light emitting elements 202 of multiple (i.e., two or more) colors, and then through the same first control signal line Kn, the first light emitting elements 202 of different colors may be controlled to emit light or not emit light at the same time, thereby reducing the number of wires in the display panel and reducing the production cost.

According to some embodiments of the present application, the first light emitting element 202 may optionally include a third-color first light emitting element. The first switch module 02 coupled with the first-color first light emitting element 51, the first switch module 02 coupled with the second-color first light emitting element 52, and the first switch module 02 coupled with the third-color first light emitting element may all be connected to the same first control signal line Kn.

The first-color first light emitting element, the second-color first light emitting element, and the third-color first light emitting element may be one of the red light emitting element, the green light emitting element, and the blue light emitting element, respectively, with different colors from one another. In some specific embodiments, for example, the first-color first light emitting element 51 may be a red first light emitting element, the second-color first light emitting element 52 may be a green first light emitting element, and the third-color first light emitting element may be a blue first light emitting element. Obviously, the colors corresponding to the first-color first light emitting element 51, the second-color first light emitting element 52, and the third-color first light emitting element may be interchanged. For example, the first-color first light emitting element 51 may be a green first light emitting element, the second-color first light emitting element 52 may be a blue first light emitting element, and the third-color first light emitting element may be a red first light emitting element, which is not limited in the embodiments of the present application.

Figure 6:
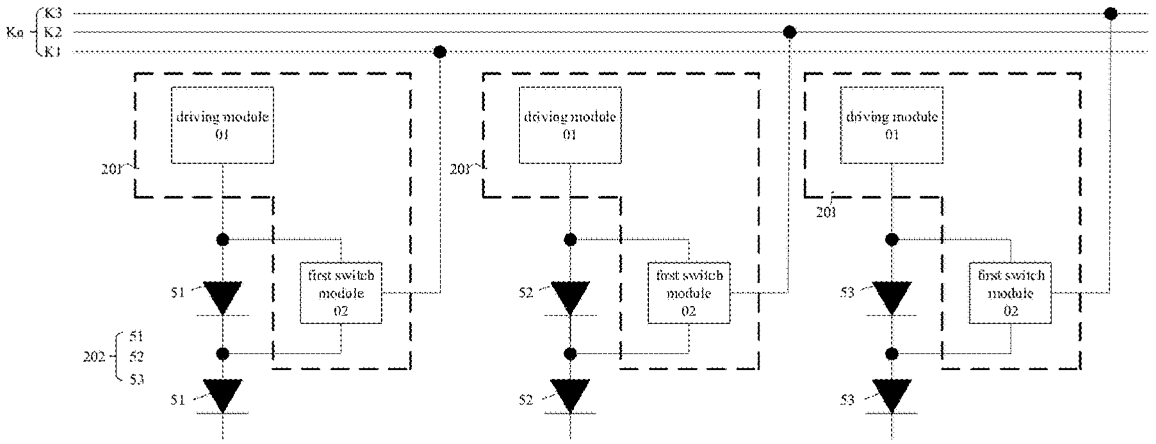
FIG. 6 is yet another schematic diagram of a circuit of a first pixel circuit and first light emitting elements in a display panel provided by the embodiments of the application.

FIG. 6 is yet another schematic diagram of a circuit of a first pixel circuit and first light emitting elements in a display panel provided by the embodiments of the application. As shown in FIG. 6, according to other embodiments of the application, the difference between the embodiments shown in FIG. 6 and FIG. 5 lies in that the first switch module 02 coupled with the first-color first light emitting element 51 and the first switch module 02 coupled with the second-color first light emitting element 52 may optionally be connected with different first control signal lines Kn. For the convenience of explanation, the first control signal line Kn connected with the first switch module 02 coupled with the first-color light emitting element 51 is referred to as a first-sub control signal line K1, and the first control signal line Kn connected with the first switch module 02 coupled with the second-color light emitting element 52 is referred to as a second-sub control signal line K2. The first-sub control signal line K1 and the second-sub control signal line K2 may be different signal lines.

When the brightness of the display panel is less than the preset brightness threshold, that is, when the brightness is low, for example, the first-sub control signal line K1 provides the turn-on level, and the second-sub control signal line K2 provides the turn-off level, so that the first switch module 02 coupled with the first-color first light emitting element 51 is turned on, and the first switch module 02 coupled with the second-color first light emitting element 52 is turned off. In this way, the first-color first light emitting element 51 connected in parallel with the first switch module 02 may not emit light due to short circuit, while the second-color first light emitting element 52 connected in parallel with the first switch module 02 emits light normally, that is, only a part the first-color first light emitting elements 51 are turned off.

For example, the display panel can be biased towards red or purple. When the brightness of the display panel is less than the preset brightness threshold, for example, only part of the red first light emitting element are turned off, that is, the brightness of the red first light emitting elements is reduced, and the color deviation phenomenon of the display panel can be further improved. Obviously, the first-color first light emitting element 51 may also be the first light emitting element of other colors, such as the blue first light emitting element, which is not limited in the embodiments of the present application.

Continue referring to FIG. 6, according to some embodiments of the present application, the first light emitting elements 202 may optionally also include the third-color first light emitting element 53. For the convenience of explanation, the first control signal line Kn connected to the first switch module 02 coupled with the third-color first light emitting element 53 is referred to as a third-sub control signal line K3. The first-sub control signal line K1, the second-sub control signal line K2 and the third-sub control signal line K3 may be different signal lines.

In some embodiments, when the brightness of the display panel is less than the preset brightness threshold, that is, when the brightness is low, for example, the first-sub control signal line K1 provides the turn-on level, the second-sub control signal line K2 provides the turn-off level, and the third-sub control signal line K3 provides the turn-on level, so that the first switch module 02 coupled with the first-color first light emitting element 51 is turned on, and the first switch module 02 coupled with the second-color first light emitting element 52 is turned off, and the first switch module 02 coupled with the third-color first light emitting element 53 is turned on. In this way, the first-color first light emitting element 51 and the third-color first light emitting element 53 connected in parallel with the first switch modules 02 may not emit light due to short circuit, while the second-color first light emitting element 52 connected in parallel with the first switch module 02 emits light normally, that is, only a part of the first-color first light emitting element 51 and a part of the third-color first light emitting element 53 are turned off.

For example, the display panel can be biased towards red or purple. When the brightness of the display panel is less than the preset brightness threshold, for example, by turning off some of the red first light emitting elements and some of the blue first light emitting elements, that is, reducing the brightness of the red first light emitting elements and the brightness of the blue first light emitting elements, the color deviation of the display panel can be further improved.

In other embodiments, when the brightness of the display panel is less than the preset brightness threshold, that is, when the brightness is low, for example, the first-sub control signal line K1 provides the turn-on level, the second-sub control signal line K2 provides the turn-off level, and the third-sub control signal line K3 provides the turn-off level, so that the first switch module 02 coupled with the first-color first light emitting element 51 is turned on, the first switch module 02 coupled with the second-color first light emitting element 52 is turned off, and the first switch module 02 coupled with the third-color first light emitting element 53 is turned off. In this way, the first-color first light emitting element 51 connected in parallel with the first switch module 02 may not emit light due to short circuit, while the second-color first light emitting element 52 and the third-color first light emitting element 53 connected in parallel with the first switch modules 02 may emit light normally, that is, only a part of the first-color first light emitting elements 51 are turned off.

In other embodiments, the third-sub control signal line K3 may reuse the first-sub control signal line K1, or the third-sub control signal line K3 may reuse the second-sub control signal line K2, thereby reducing the number of wirings and saving wiring space.

Figure 7:
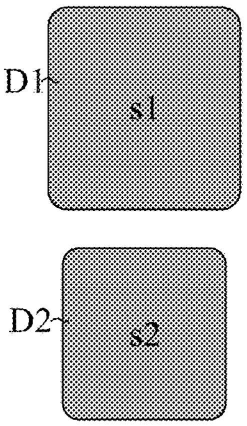
FIG. 7 is schematic diagram of a comparison of light emitting areas of a first-sub first light emitting element and a second-sub first light emitting element in a display panel provided by the embodiments of the application.

FIG. 7 is schematic diagram of a comparison of light emitting areas of a first-sub first light emitting element and a second-sub first light emitting element in a display panel provided by the embodiments of the application. In combination with FIGS. 2 and 7, according to some embodiments of the present application, the first light emitting element 202 may optionally include a first-sub first light emitting element D1 and a second-sub second light emitting element D2 coupled with the same first pixel circuit 201. The first-sub first light emitting element D1 may be connected in parallel with the first switch module 02. The second-sub first light emitting element D2 may be connected in series with the first switch module 02. The light emitting area s1 of the first-sub first light emitting element D1 may be greater than or equal to the light emitting area s2 of the second-sub first light emitting element D2. In some specific examples, for example, the light emitting area s1 of the first-sub first light emitting element D1 may be larger than the light emitting area s2 of the second-sub first light emitting element D2.

When the brightness of the display panel is less than the preset brightness threshold, that is, when the brightness is low, the first switch module 02 is turned on, the first-sub first light emitting element D1 does not emit light due to short circuit, and the second-sub first light emitting element D2 emits light. In this way, since the light emitting area of the first-sub first light emitting element D1 is larger than the light emitting area of the second-sub first light emitting element D2, the first-sub first light emitting element D1 with a larger light emitting area is turned off, and the second-sub first light emitting element D2 with a smaller light emitting area emits light. The larger the driving current of the corresponding first pixel circuit 201 may be designed, the less likely it is to cause color deviation, which further improves the color deviation problem.

Figure 8:
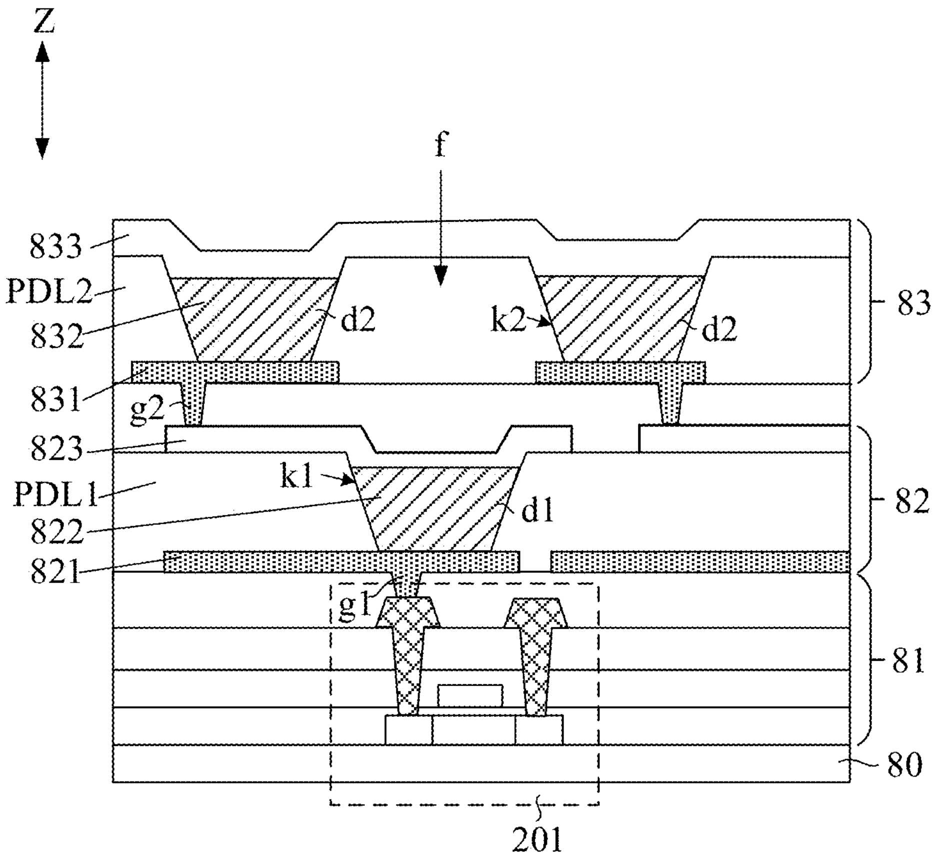
FIG. 8 is a schematic partial cross section view of a display panel provided by the embodiments of the application.

FIG. 8 is a schematic partial cross section view of a display panel provided by the embodiments of the application. In combination with FIGS. 2 and 8, according to some embodiments of the present application, the first light emitting element 202 may optionally include the first-sub first light emitting element D1 and the second-sub first light emitting element D2 coupled with the same first pixel circuit 201. The first-sub first light emitting element D1 may include a first light emitting unit d1, the second-sub first light emitting element D2 may include a second light emitting unit d2, and the first light emitting unit d1 and the second light emitting unit d2 may be arranged in staggered layers. The first light emitting unit d1 and the second light emitting unit d2 may be organic light emitting materials.

For example, in some specific embodiments, the display panel 20 may include a substrate 80, a driving device layer 81, a first light emitting element layer 82, and a second light emitting element layer 83 stacked in layers. The substrate 80 can be a flexible substrate formed by polymer materials such as polyimide (PI), polycarbonate (PC), polyether sulfone (PES), polyethylene terephthalate (PET), polyethylene naphthalate (PEN), polyaryl compounds (PAR) or glass fiber reinforced plastics (FRP), or a hard substrate formed by materials such as glass. The driving device layer 81 may include a plurality of laminated metal layers and an insulating layer sandwiched between any two metal layers. The first pixel circuit 201 may be located in the driving device layer 81. The first-sub first light emitting element D1 may be located in the first light emitting element layer 82, and the first-sub first light emitting element D1 may be electrically connected with the first pixel circuit 201 in the driving device layer 81 through a via. The second-sub first light emitting element D2 may be located in the second light emitting element layer 83, and the second-sub first light emitting element D2 may be connected in series with the first-sub first light emitting element D1 in the first light emitting element layer 82 through a via.

It should be noted that in other embodiments, the first-sub first light emitting element D1 may also be located in the second light emitting element layer 83, and the second-sub first light emitting element D2 may be located in the first light emitting element layer 82, which is not limited in the embodiments of the application.

Compared with the traditional scheme that one pixel circuit is connected to one light emitting element, in the embodiments of the present application, one first pixel circuit 201 is connected to the first-sub first light emitting element D1 and the second-sub second light emitting element D2 at the same time, which it is equivalent to doubling the number of light emitting elements in the sub-pixel. In this way, since the first light emitting unit d1 and the second light emitting unit d2 are staggered, that is, the first-sub first light emitting element D1 and the second-sub second light emitting element D2 are staggered, the first-sub first light emitting element D1 and the second-sub second light emitting element D2 with numerous data may be well arranged in a limited space, while ensuring that the display panel has a high pixel density (Pixels Per Inch, PPI).

Continue referring to FIG. 8, according to some embodiments of the present application, in a thickness direction Z of the display panel, a light emitting area of the first-sub first light emitting element D1 and a light emitting area of the second-sub first light emitting element D2 are at least partially staggered. For example, the second light emitting element layer 83 is provided with a plurality of second light emitting units d2 arranged at intervals, and a gap f exists between two adjacent second light emitting units d2 in the second light emitting element layer 83. In the thickness direction Z of the display panel, the first light emitting unit d1 in the first light emitting element layer 82 overlaps at least partially with the gap f in the second light emitting element layer 83.

In this way, since the light emitting areas of the first-sub first light emitting element D1 and the second-sub first light emitting element D2 are at least partially staggered, at least part of the light emitted by the first-sub first light emitting element D1 can be emitted through the gap f, and the light emitted by the first-sub first light emitting element D1 will not be completely blocked due to the staggered arrangement of the first light emitting unit d1 and the second light emitting unit d2, which may increase the light emitting area of the display panel.

Continue referring to FIG. 8, according to some embodiments of the present application, the first light emitting element layer 82 may optionally include a first anode layer 821, a first light emitting material layer 822 and a first cathode layer 823 stacked in layers. The second light emitting element layer 83 may include a second anode layer 831, a second light emitting material layer 832 and a second cathode layer 833 stacked in layers. The display panel 20 may also include a first pixel definition layer PDL1 and a second pixel definition layer PDL2, the first pixel definition layer PDL1 is set on the same layer as the first light emitting material layer 822, and the second pixel definition layer PDL2 is set on the same layer as the second light emitting material layer 832.

The first light emitting unit d1 is located in the first light emitting material layer 822, and the second light emitting unit d2 is located in the second light emitting material layer 832. The first pixel definition layer PDL1 is provided with a first pixel opening k1, and the first light emitting unit d1 in the first light emitting material layer 822 may be located in the first pixel opening k1. The second pixel definition layer PDL2 is provided with a second pixel opening k2, and the second light emitting unit d2 in the second light emitting material layer 832 is located in the second pixel opening k2. In the thickness direction Z of the display panel, the first pixel opening k1 and the second pixel opening k2 do not overlap at least partially.

In some specific embodiments, optionally, the first anode layer 821 is provided with an anode of the first-sub first light emitting element D1, and the anode of the first-sub first light emitting element D1 is electrically connected with the first pixel circuit 201 of the driving device layer 81 through the first via g1. The first cathode layer 823 is provided with a cathode of the first-sub first light emitting element D1. The second anode layer 831 is provided with an anode of the second-sub first light emitting element D2, and the cathode of the first-sub first light emitting element D1 is electrically connected with the anode of the second-sub first light emitting element D2 through the second via g2.

Figure 9:
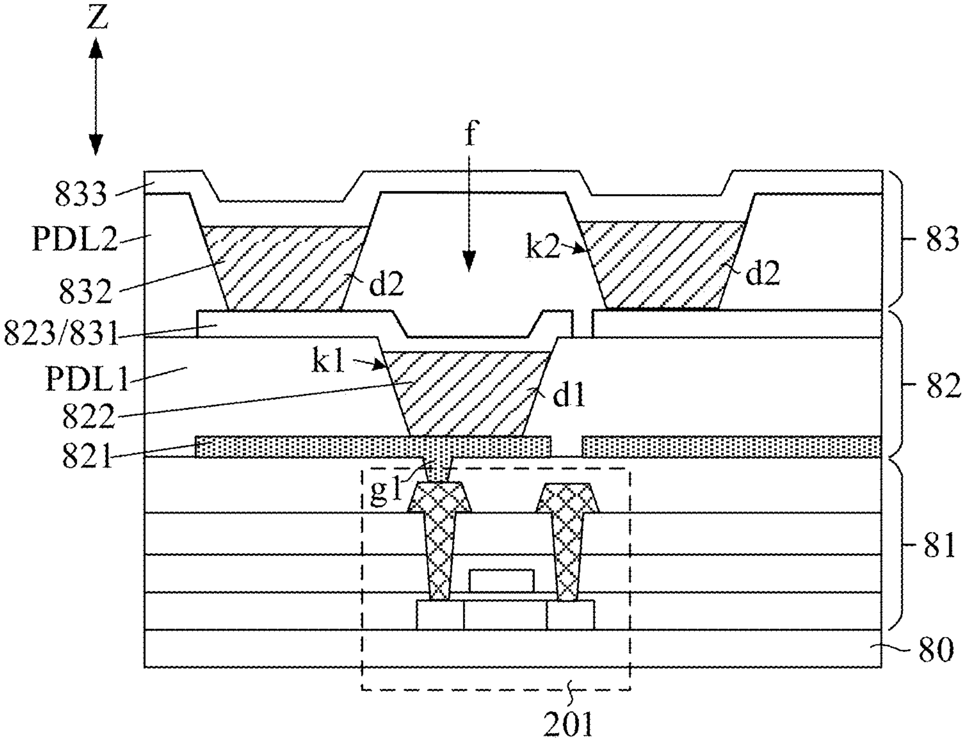
FIG. 9 is another schematic partial cross section view of a display panel provided by the embodiments of the application.

FIG. 9 is another schematic partial cross section view of a display panel provided by the embodiments of the application. As shown in FIG. 9, according to other embodiments of the application, the difference between the embodiments shown in FIG. 9 and FIG. 8 lies in that the cathode of the first-sub first light emitting element D1 may optionally be reused as the anode of the second-sub second light emitting element D2. For example, the first cathode layer 823 may be the same film layer as the second anode layer 831. The conductive material in the first cathode layer 823 may be used as both the cathode of the first-sub first light emitting element D1 and the anode of the second-sub first light emitting element D2.

In this way, since the cathode of the first-sub first light emitting element D1 is reused as the anode of the second-sub second light emitting element D2, the number of film layers in the display panel may be reduced, the production cost of the display panel and the thickness of the display panel may be reduced, which is conducive to the light-weight design of the display panel.

According to some embodiments of the present application, optionally, the first switch module 02 may be in the turn-on state all the time when the brightness of the display panel is less than the preset brightness threshold value, that is, the first control signal line Kn continuously outputs the turn-on level. Taking the first switch module 02 as a P-type transistor as an example, for example, during the whole time when the brightness of the display panel is less than the preset brightness threshold, the first control signal line Kn continuously outputs a low level, so that the first switch module 02 is always in the turn-on state.

Figure 10:
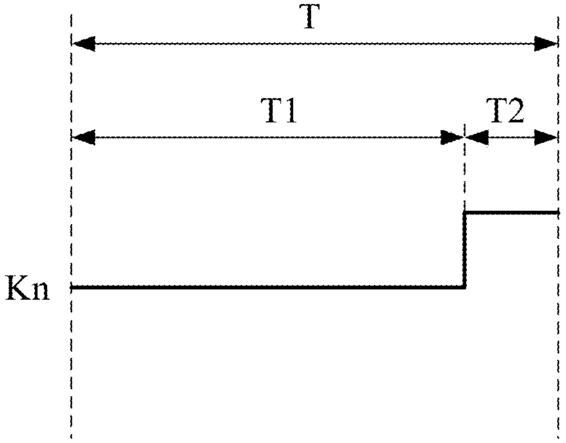
FIG. 10 is a schematic timing diagram of a first pixel circuit in a display panel provided by the embodiments of the application.

FIG. 10 is a schematic timing diagram of a first pixel circuit in a display panel provided by the embodiments of the application. As shown in FIG. 2 and FIG. 10, according to other embodiments of the present application, optionally, the first switch module 02 may also be turned on only for a portion (such as time period T1) of the whole time period T when the brightness of the display panel is less than the preset brightness threshold.

For example, before switching the brightness of the display panel from the first brightness to the second brightness, for example, in the time period T2, the first control signal line Kn may be controlled to switch from the outputting of the turn-on level to the outputting of the turn-off level in advance, so that the first switch module 02 is gradually turned off, and then the first light emitting element 202 connected in parallel with the first switch module 02 is gradually turned on. Thus the brightness of the display panel transitions smoothly, effectively avoiding brightness jump. The first brightness may be less than the preset brightness threshold, and the second brightness can be greater than the preset brightness threshold.

It is considered by the inventor of the present application that since the first pixel circuit 201 needs to drive the M first light emitting elements 202 which are connected in series, the original driving ability of the first pixel circuit 201 may not be suitable to drive the M first light emitting elements 202 which are connected in series.

Figure 11:
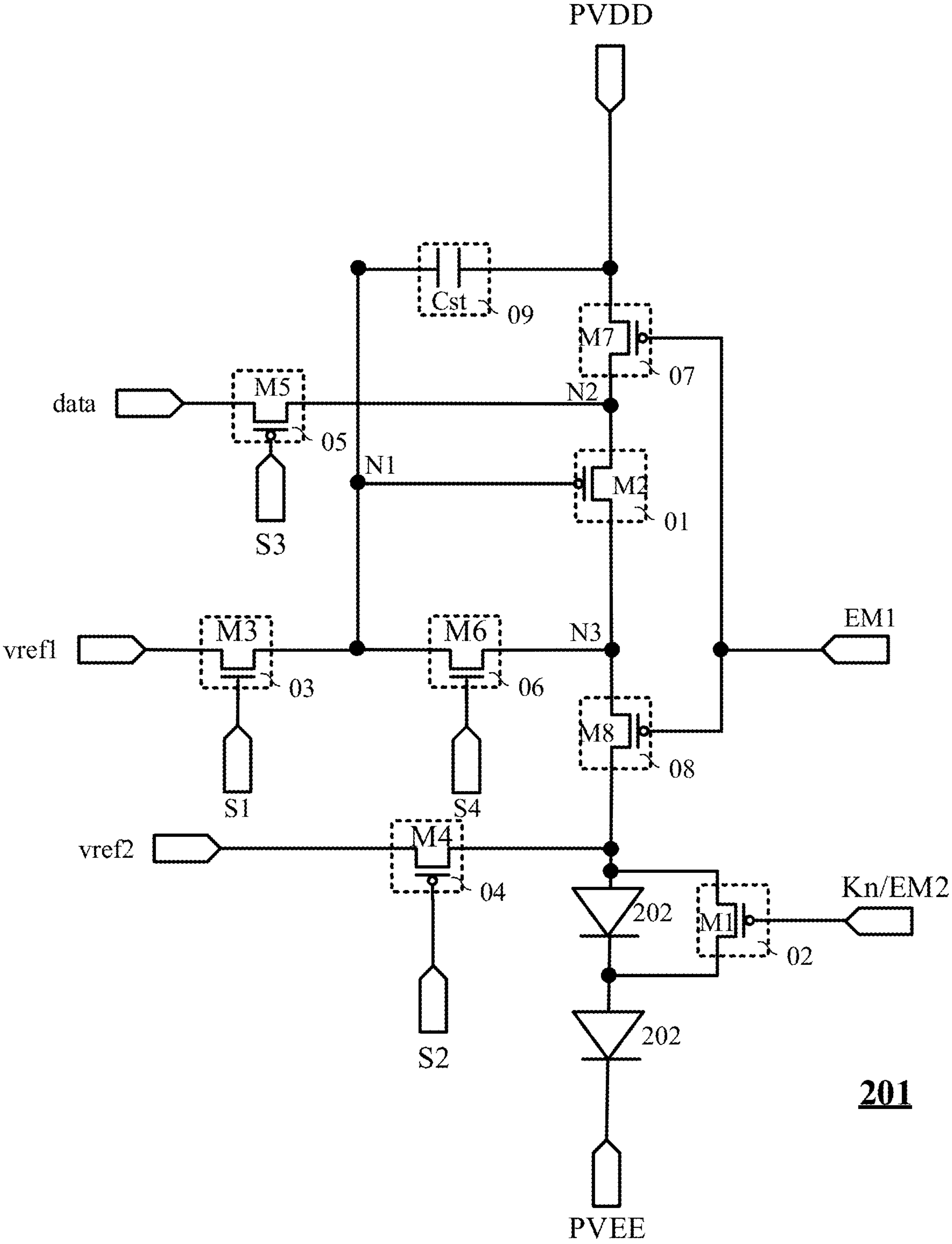
FIG. 11 is a schematic diagram of a circuit of a first pixel circuit in a display panel provided by the embodiments of the application.

FIG. 11 is a schematic diagram of a circuit of a first pixel circuit in a display panel provided by the embodiments of the application. As shown in FIG. 11, according to some embodiments of the present application, the first pixel circuit 201 can optionally be electrically connected with a first power supply voltage signal line PVDD and a second power supply voltage signal line PVEE, respectively. The first power supply voltage signal line PVDD provides a first power supply voltage signal for the first pixel circuit 201, and the second power supply voltage signal line PVEE provides a second power supply voltage signal for the first pixel circuit 201. By way of example, the first power supply voltage signal may be a positive power supply voltage signal, and the second power supply voltage signal may be a negative power supply voltage signal. A difference (including absolute value) between a voltage value of the first power supply voltage signal and a voltage value of the second power supply voltage signal may be greater than 7V.

That is, the voltage between the first power supply voltage signal and the second power supply voltage signal is increased to more than 7V, so as to improve the driving ability of the first pixel circuit 201 and ensure that the first pixel circuit 201 may better drive the M first light emitting elements 202 connected in series.

In order to better understand the embodiments of the application, the display panel provided in the embodiments of the application is illustrated below in combination with a 8T1C pixel circuit and a 9T1C pixel circuit.

As shown in FIG. 11, according to some embodiments of the present application, the first switch module 02 may optionally include a first transistor M1, the gate of the first transistor M1 is electrically connected with the first control signal line Kn, and the first electrode of the first transistor M1 is electrically connected with the $1^{st}$ one of the N first light emitting elements 202, the second electrode of the first transistor M1 is electrically connected with the second electrode of the $N^{th}$ one of the N first light emitting elements 202.

When the brightness of the display panel is less than the preset brightness threshold, the first transistor M1 is turned on under the control of the first control signal line Kn, and the first light emitting elements 202 connected in parallel with the first transistor M1 do not emit light, so the total light emitting area of the M first light emitting elements 202 is decreased. As the light emitting area decreases, in order to realize the original desired brightness, the driving current of the first pixel circuit needs to be designed to be greater than the original value. As the driving current of the first pixel circuit increases, the charging times of the first light emitting elements of different colors can be reduced, the difference in charging time among the first light emitting elements of different colors can be reduced, the problem of color deviation can be improved, and the display quality of the display panel can be improved.

As shown in FIG. 11, according to some embodiments of the application, optionally, a control terminal of the drive module 01 is electrically connected with a first node N1, a first terminal of the drive module 01 is electrically connected with a second node N2, and a second terminal of the drive module 01 is electrically connected with a third node N3.

The first pixel circuit 201 further includes a first reset module 03, a second reset module 04, a data writing module 05, a threshold compensation module 06, a first light emitting control module 07, a second light emitting control module 08, and a storage module 09.

A control terminal of the first reset module 03 is electrically connected with a first scan signal line S1, a first terminal of the first reset module 03 is electrically connected with a first reference voltage signal line vref1, and a second terminal of the first reset module 03 is electrically connected with the first node N1. The first reset module 03 is turned on under the control of the first scan signal line S1, and is configured to transmit the first reference voltage signal provided by the first reference voltage signal line vref1 to the first node N1 to reset the first node N1.

A control terminal of the second reset module 04 is electrically connected with a second scanning signal line S2, a first terminal of the second reset module 04 is electrically connected with a second reference voltage signal line vref2, and a second terminal of the second reset module 04 is electrically connected with the first electrode of the $1^{st}$ one of the M first light emitting elements 202 connected in series. The second reset module 04 is turned on under the control of the second scan signal line S2, and is configured to transmit the second reference voltage signal provided by the second reference voltage signal line vref2 to the first electrode of the $1^{st}$ one of the M first light emitting elements 202 connected in series to reset the first electrode of the first light emitting element 202.

It should be noted that the first scan signal line S1 and the second scan signal line S2 may be reused, and the first scan signal line S1 and the second scan signal line S2 may also not be reused, which is not limited in the embodiments of the application.

A control terminal of the data writing module 05 is electrically connected with a third scanning signal line S3, a first terminal of the data writing module 05 is electrically connected with a data signal line data, and a second terminal of the data writing module 05 is electrically connected with the second node N2. The data writing module 05 is turned on under the control of the third scan signal line S3, and is configured to write the data signal of the data signal line data to the second node N2.

A control terminal of the threshold compensation module 06 is electrically connected with a fourth scanning signal line S4, a first terminal of the threshold compensation module 06 is electrically connected with the first node N1, and a second terminal of the threshold compensation module 06 is electrically connected with the third node N3. The threshold compensation module 06 is turned on under the control of the fourth scan signal line S4, and is configured to connect the control terminal of the drive module 01 with the second terminal of the drive module 01 to realize the threshold voltage compensation for the drive module 01.

A control terminal of the first light emitting control module 07 is electrically connected with a first light emitting control signal line EM1, a first terminal of the first light emitting control module 07 is electrically connected with the first power supply voltage signal line PVDD, and a second terminal of the first light emitting control module 07 is electrically connected with the second node N2.

A control terminal of the second light emitting control module 08 is electrically connected with the first light emitting control signal line EM1, a first terminal of the second light emitting control module 08 is electrically connected with the third node N3, and a second terminal of the second light emitting control module 08 is electrically connected with the first electrode of the $1^{st}$ one of the M first light emitting elements 202 connected in series. The first light emitting control module 07 and the second light emitting control module 08 are turned on under the control of the first light emitting control signal line EM1 to control the first light emitting element 202 to emit light.

A first terminal of the storage module 09 is electrically connected with the first power supply voltage signal line PVDD, and a second terminal of the storage module 09 is electrically connected with the first node N1 to maintain the potential of the first node N1.

In some embodiments, the first control signal line Kn may specifically be the second light emitting control signal line EM2, which is not limited in the embodiments of the present application.

In some specific embodiments, the drive module 01 may optionally include a second transistor M2, the first reset module 03 may include a third transistor M3, the second reset module 04 may include a fourth transistor M4, the data writing module 05 may include a fifth transistor M5, the threshold compensation module 06 may include a sixth transistor M6, and the first light emitting control module 07 may include a seventh transistor M7, the second light emitting control module 08 may include an eighth transistor M8, and the memory module 09 may include a storage capacitor Cst. For the connection of the respective transistors and storage capacitor Cst, please refer to FIG. 11 and the description of the connection of the respective modules above, which will not be repeated here. Optionally, the third transistor M3 and the sixth transistor M6 may both be N-type transistors.

Figure 12:
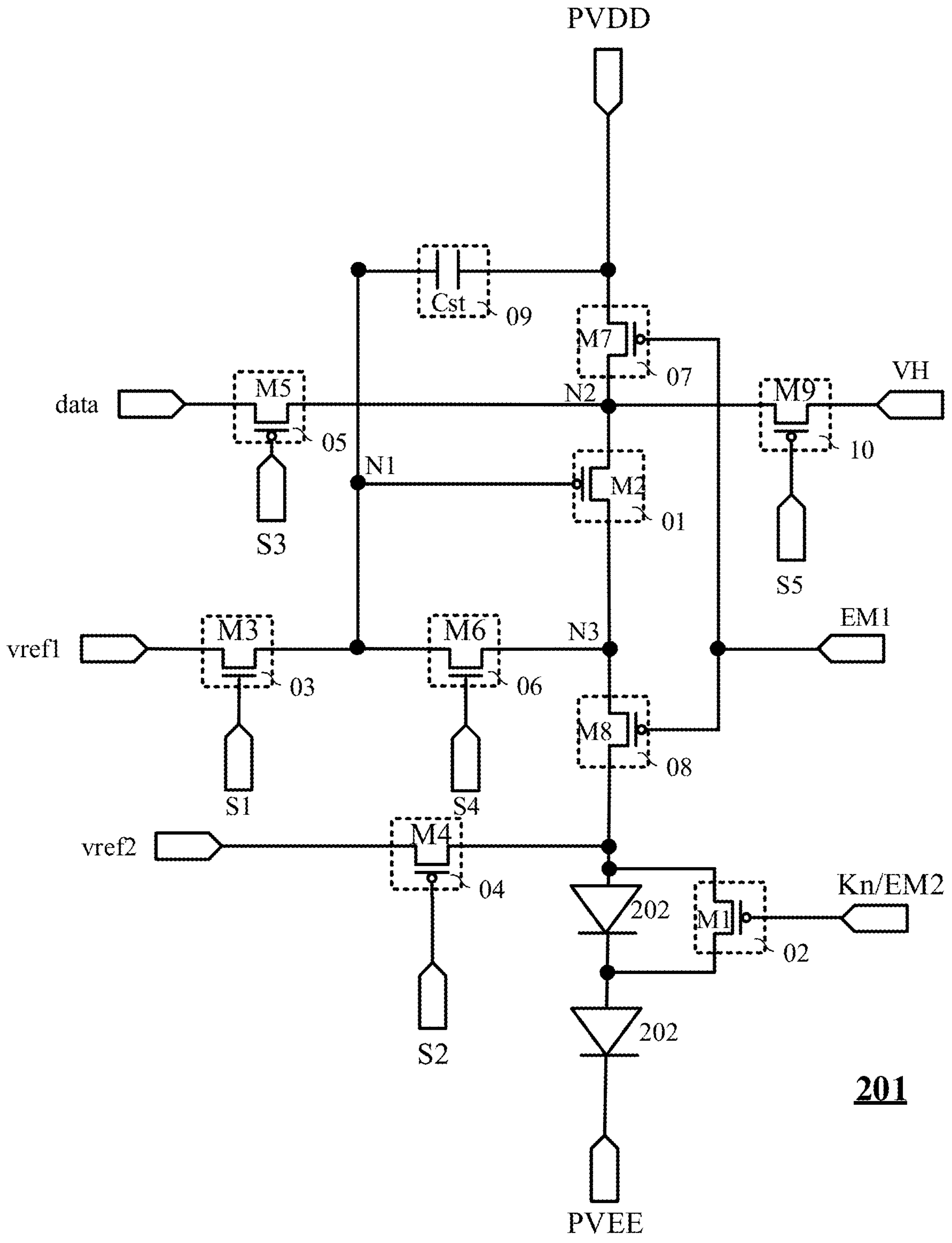
FIG. 12 is another schematic diagram of a circuit of a first pixel circuit in a display panel provided by the embodiments of the application.

FIG. 12 is another schematic diagram of a circuit of a first pixel circuit in a display panel provided by the embodiments of the application. As shown in FIG. 12, according to other embodiments of the application, the difference between the embodiments shown in FIG. 12 and FIG. 11 lies in that the first pixel circuit 201 may optionally include a bias compensation module 10, a control terminal of the bias compensation module 10 is electrically connected with a fifth scan signal line S5, a first terminal of the bias compensation module 10 is electrically connected with a bias compensation voltage signal line VH, and a second terminal of the bias compensation module 10 is electrically connected with the second node N2.

Figure 13:
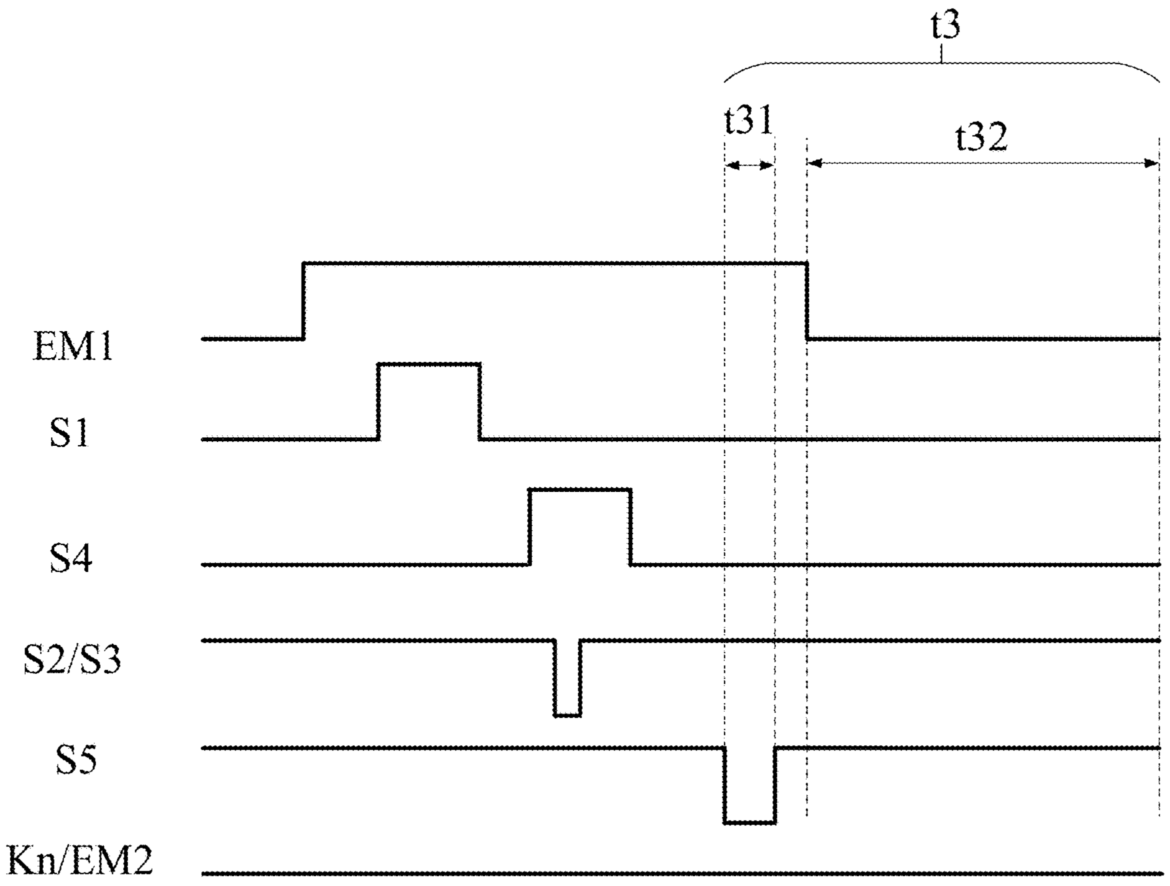
FIG. 13 is a schematic timing diagram corresponding to the first pixel circuit shown in FIG. 12.

FIG. 13 is a schematic timing diagram corresponding to the first pixel circuit shown in FIG. 12. As shown in FIG. 12 and FIG. 13, a light emitting stage t3 may include a first stage t31 and a second stage t32. In the first stage t31, the bias compensation module 10 is turned on in response to the turn-on level of the fifth scan signal line S5, transmits the bias compensation voltage signal of the bias compensation voltage signal line VH to the second node N2, so that the potential at the second terminal of the drive module 01 is higher than the potential at the control terminal of the drive module 01, which results in that the drive module 01 is in a bias state, and the threshold voltage Vth of the drive module 01 is adjusted.

In the second stage t32, the first light emitting control module 07 is turned on in response to the turn-on level of the first light emitting control signal line EM1, the second light emitting control module 08 is turned on in response to the turn-on level of the first light emitting control signal line EM1, and the first light emitting element 202 emits light.

In this way, by adjusting the threshold voltage Vth of the drive module 01 before the first light emitting element 202 emits light, it can be ensured that when the first light emitting element 202 emits light, the offset of the threshold voltage Vth of the drive module 01 is small, which ensures that the brightness of the first light emitting element 202 may reach an expected brightness.

As shown in FIG. 13, in some specific embodiments, the bias compensation module 10 may optionally include a ninth transistor M9, a gate of the ninth transistor M9 is electrically connected to the fifth scan signal line S5, a first electrode of the ninth transistor M9 is electrically connected to the bias compensation voltage signal line VH, and a second electrode of the ninth transistor M9 is electrically connected to the second node N2. In the first stage t31, the ninth transistor M9 is turned on in response to the turn-on level of the fifth scan signal line S5, and transmits the offset compensation voltage signal of the offset compensation voltage signal line VH to the second node N2, so that the potential at the second electrode of the second transistor M2 is higher than the potential at the gate of the second transistor M2, which results in that the second transistor M2 is in a bias state, and the threshold voltage Vth of the second transistor M2 is adjusted.

Based on the display panel 20 provided by the above embodiments, correspondingly, the embodiments of the application further provide a driving method of a display panel. The driving method of the display panel may be applied to the display panel 20 provided by the above embodiments.

Figure 14:
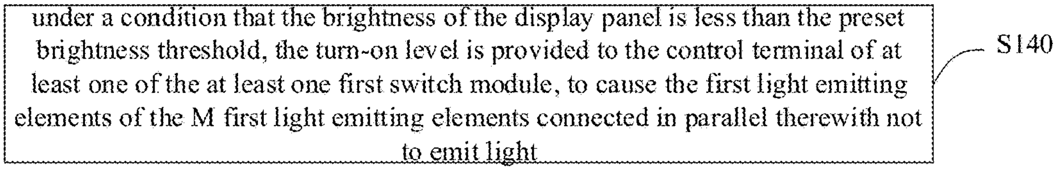
FIG. 14 is a schematic flow diagram of a driving method of a display panel provided by the embodiments of the application.

FIG. 14 is a schematic flow diagram of a driving method of a display panel provided by the embodiments of the application. As shown in FIG. 14, the driving method of the display panel may include the following steps.

At S140, under a condition that the brightness of the display panel is less than the preset brightness threshold, the turn-on level is provided to the control terminal of at least one of the at least one first switch module, to cause the first light emitting elements of the M first light emitting elements connected in parallel therewith not to emit light. The preset brightness threshold may be flexibly set according to the actual situation, which is not limited in the embodiments of the application.

The specific process of S140 has been described in detail when the display panel 20 provided by the above product embodiments is described, and will not be repeated here.

According to the driving method of the display panel, the display panel includes the first pixel circuit and the first light emitting elements, the first pixel circuit is electrically connected with the M first light emitting elements which are connected in series, M and M is an integer, and the first pixel circuit includes: a driving module configured to drive the first light emitting elements to emit light; and at least one first switch module connected in parallel with N first light emitting elements, $1 \leq N < M$ and N being a positive integer. When the brightness of the display panel is less than the preset brightness threshold, the first switch module is turned on, the first light emitting elements connected in parallel with the first switch module do not emit light due to short circuit, so that the light emitting area is decreased. As the light emitting area decreases, in order to realize the original desired brightness, the driving current of the first pixel circuit needs to be designed to be greater than the original value. As the driving current of the first pixel circuit increases, the difference in charging time among light emitting elements of different colors can be reduced, the problem of color deviation can be improved, and the display quality of the display panel can be improved.

According to some embodiments of the present application, the preset brightness threshold optionally includes a first brightness threshold and a second brightness threshold, and the first brightness threshold is greater than the second brightness threshold. The first pixel circuit includes a plurality of first switch modules which are respectively connected in parallel with different first light emitting elements.

Figure 15:
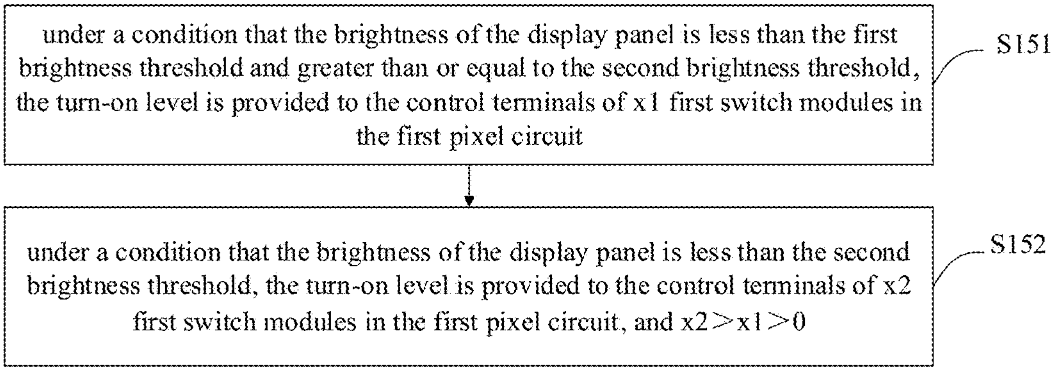
FIG. 15 is another schematic flow diagram of a driving method of a display panel provided by the embodiments of the application.

FIG. 15 is another schematic flow diagram of a driving method of a display panel provided by the embodiments of the application. As shown in FIG. 15, at S140, under a condition that the brightness of the display panel is less than the preset brightness threshold, the turn-on level being provided to at least one first switch module, may specifically include the following steps:

at S151, under a condition that the brightness of the display panel is less than the first brightness threshold and greater than or equal to the second brightness threshold, the turn-on level is provided to the control terminals of x1 first switch modules in the first pixel circuit; and at S152, under a condition that the brightness of the display panel is less than the second brightness threshold, the turn-on level is provided to the control terminals of x2 first switch modules in the first pixel circuit, and x2>x1>0.

The specific processes of S151 and S152 have been described in detail when the display panel 20 provided by the above product embodiments is described, and will not be repeated here.

In this way, on the basis that the first switch module may short-circuit the first light emitting element connected in parallel with it, which results in that some of the first light emitting elements do not emit light, a more refined control may be realized, that is, the lower the brightness of the display panel is, the greater the number of the first light emitting elements 202 that are turned off is, and different degrees of color deviation adjustment may be realized.

According to some embodiments of the application, optionally, the control terminal of the first switch module is electrically connected with the first control signal line. The first light emitting elements include a first-color first light emitting element and a second-color first light emitting element. The first switch module coupled with the first-color first light emitting element and the first switch module coupled with the second-color first light emitting element are connected to the same first control signal line.

Correspondingly, at S140, under a condition that the brightness of the display panel is less than the preset brightness threshold, the turn-on level being provided to at least one first switch module, may specifically include the following steps:

under a condition that the brightness of the display panel is less than the preset brightness threshold, the turn-on level is provided to the first control signal line, to cause the first-color first light emitting element and the second-color first light emitting element connected in parallel with the first switch module not to emit light.

In this way, the same first control signal line may be connected with the first switch modules coupled with the first light emitting elements of multiple colors, and then through the same first control signal line, the first light emitting elements of different colors may be controlled to emit light or not emit light at the same time, thereby reducing the number of wires in the display panel and reducing the production cost.

According to some embodiments of the application, optionally, the control terminal of the first switch module is electrically connected with the first control signal line. The first light emitting element includes a first-color first light emitting element and a second-color first light emitting element. The first switch module coupled with the first-color first light emitting element and the first switch module coupled with the second-color first light emitting element are connected with different first control signal lines.

Correspondingly, at S140, under a condition that the brightness of the display panel is less than the preset brightness threshold, the turn-on level being provided to at least one first switch module, may specifically include the following steps:

under a condition that the brightness of the display panel is less than the preset brightness threshold, the first control signal line corresponding to the first-color first light emitting element is provided with the turn-on level, and the first control signal line corresponding to the second-color first light emitting element is provided with the turn-off level, to cause the first-color first light emitting element connected in parallel with the first switch module not to emit light, and cause the second-color first light emitting element connected in parallel with the first switch module to emit light.

For example, the display panel can be biased towards red or purple. When the brightness of the display panel is less than the preset brightness threshold, for example, only part of the red first light emitting element are turned off, that is, the brightness of the red first light emitting elements is reduced, and the color deviation phenomenon of the display panel can be further improved.

Each step of the driving method of the display panel provided by the above method embodiments has been described in detail when the display panel 20 provided by the above product embodiments is described, and will not be repeated here.

Figure 16:
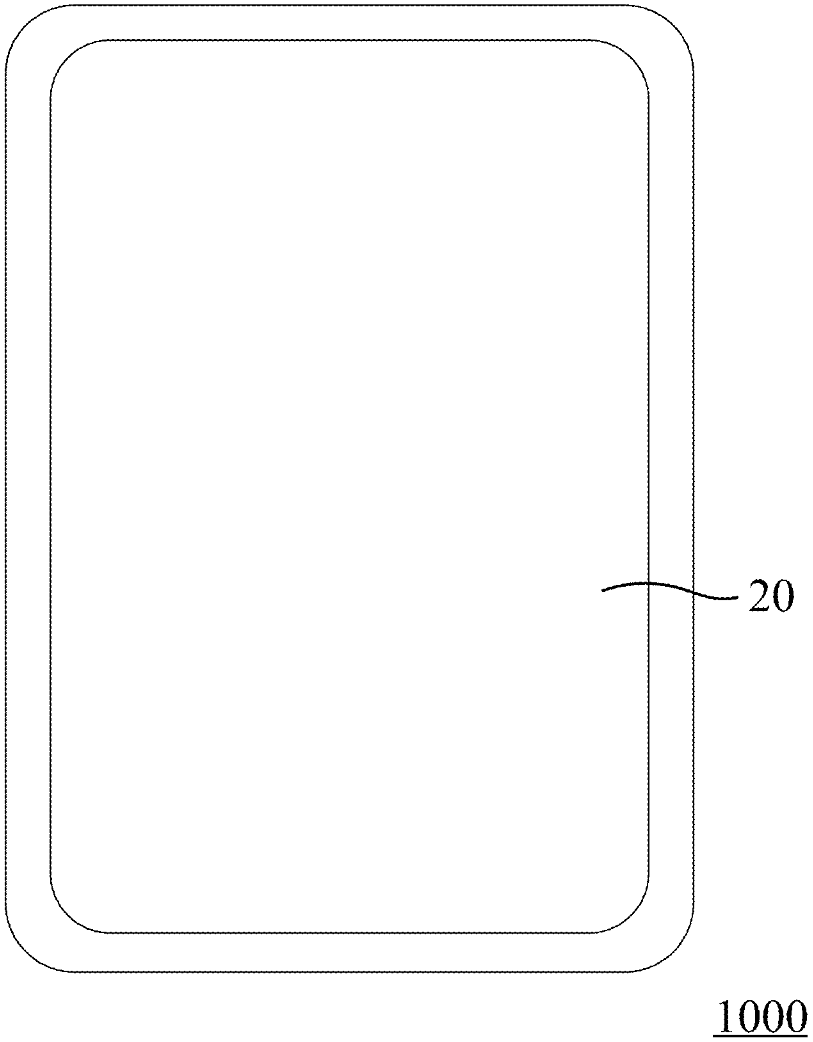
FIG. 16 is a schematic structure diagram of a display apparatus provided by the embodiments of the application.

Based on the display panel provided by the above embodiments, correspondingly, the present application further provides a display apparatus including the display panel provided by the present application. Please refer to FIG. 16. FIG. 16 is a schematic structure diagram of a display apparatus provided by the embodiments of the present application. The display apparatus 1000 provided in FIG. 16 includes the display panel 20 provided by any of the above embodiments of the present application. The embodiment of FIG. 16 only takes a mobile phone as an example to describe the display apparatus 1000. It may be understood that the display apparatus provided by the embodiments of the present application may be a wearable product, a computer, a TV, a vehicle-mounted display apparatus, and other devices with a display function, which is not specifically limited in this application. The display apparatus provided by the embodiments of the present application has the beneficial effects of the display panel 20 provided by the embodiments of the present application. For details, reference may be made to the specific descriptions of the display panel 20 in the above-mentioned embodiments, which will not be repeated in this embodiment.

It should be understood that the specific structures of the circuits and the cross-sectional structures of the display panel provided in the accompanying drawings of the embodiments of the present application are only some examples, and are not intended to limit the present application. In addition, the above-mentioned embodiments provided by the present application may be combined with one another if there is no contradiction.

It should be noted that all embodiments in this specification are described in a progressive manner, and the same or similar parts of the respective embodiments may be referred to each other. Each embodiment focuses on the differences with other embodiments. According to the embodiments of the present application as described above, these embodiments do not describe all details in detail, nor do they limit the application to be only the specific embodiments described. Obviously, according to the above description, many modifications and changes may be made. These embodiments are selected and specifically described in this specification in order to better explain the principle and practical application of this application, so that those skilled in the art may make good use of this application and modify it on the basis of this application. This application is only limited by the claims and their scopes and equivalents.

Those skilled in the art should understand that the above embodiments are exemplary rather than restrictive. Different technical features in different embodiments may be combined to achieve beneficial effects. Those skilled in the art should understand and realize other changed embodiments for the disclosed embodiments on the basis of studying the drawings, the description and the claims. In the claims, the term "comprising" does not exclude other structures; the quantity involves "one" does not exclude multiple; the terms "first" and "second" are used to designate names and not to indicate any particular order. Any reference numerals in the claims shall not be construed as limiting the protection scope. The presence of certain technical features in different dependent claims does not mean that these technical features cannot be combined to obtain beneficial effects.

The above are only specific implementations of the present application. Those skilled in the art can clearly understand that, for the ease and brevity of description, the specific operating process of the above-described systems, modules and units may refer to the corresponding process in the foregoing method embodiments, which will not be repeated here. It should be understood that the protection scope of the present application is not limited to this. Any person skilled in the art can easily conceive of various equivalent modifications or replacements within the technical scope disclosed in the present application, and these modifications or replacements should all fall within the protection scope of the present application.

What is claimed is:

1. A display panel comprising a first pixel circuit and first light emitting elements, wherein the first pixel circuit is electrically connected with M first light emitting elements which are connected in series, M≥2 and M is an integer, and the first pixel circuit comprises:

a driving module configured to drive the first light emitting elements to emit light; and at least one first switch module connected in parallel with N first light emitting elements, 1≤N<M and N being an integer.

2. The display panel according to claim 1, wherein the first pixel circuit comprises a plurality of first switch modules which are connected in parallel with different first light emitting elements respectively;

under a condition that a brightness of the display panel is less than a first brightness threshold and greater than or equal to a second brightness threshold, x1 first switch modules in the first pixel circuit are turned on; and under a condition that the brightness of the display panel is less than the second brightness threshold, x2 first switch modules in the first pixel circuit are turned on, x2>x1>0, and each of x1 and x2 is an integer.

3. The display panel according to claim 1, wherein a control terminal of the first switch module is electrically connected with a first control signal line, a first terminal of the first switch module is electrically connected with a first electrode of a $1^{st}$ one of the N first light emitting elements, and a second terminal of the first switch module is electrically connected with a second electrode of a $N^{th}$ one of the N first light emitting elements.

4. The display panel according to claim 3, wherein the first light emitting elements comprise a first-color first light emitting element and a second-color first light emitting element, and the first switch module coupled with the first-color first light emitting element and the first switch module coupled with the second-color first light emitting element are connected with a same first control signal line.

5. The display panel according to claim 3, wherein the first light emitting elements comprise a first-color first light emitting element and a second-color first light emitting element, and the first switch module coupled with the first-color first light emitting element and the first switch module coupled with the second-color first light emitting element are connected with different first control signal lines.

6. The display panel according to claim 1, wherein the first light emitting elements comprise a first-sub first light emitting element and a second-sub first light emitting element which are coupled with a same first pixel circuit, the first-sub first light emitting element is connected in parallel with the first switch module, and the second-sub first light emitting element is connected in series with the first switch module, an emitting area of the first-sub first light emitting element is greater than or equal to an emitting area of the second-sub first light emitting element.

7. The display panel according to claim 1, wherein the first light emitting elements comprise a first-sub first light emitting element and a second-sub first light emitting element which are coupled with a same first pixel circuit, the first-sub first light emitting element comprises a first light emitting part, the second-sub first light emitting element comprises a second light emitting part, and the first light emitting part and the second light emitting part are arranged in staggered layers.

8. The display panel according to claim 7, wherein in a thickness direction of the display panel, a light emitting area of the first-sub first light emitting element and a light emitting area of the second-sub first light emitting element are at least partially staggered.

9. The display panel according to claim 7, wherein a cathode of the first-sub first light emitting element is reused as an anode of the second-sub second light emitting element.

10. The display panel according to claim 1, wherein the first switch module is only turned on for a portion of a whole time period when a brightness of the display panel is less than a preset brightness threshold.

11. The display panel according to claim 1, wherein the first pixel circuit is electrically connected with a first power supply voltage signal line and a second power supply voltage signal line, the first power supply voltage signal line is to provide a first power supply voltage signal for the first pixel circuit, and the second power supply voltage signal line is to provide a second power supply voltage signal for the first pixel circuit, and wherein a difference between a voltage value of the first power supply voltage signal and a voltage value of the second power supply voltage signal is greater than 7V.

12. A driving method of display panel, wherein the display panel comprises a first pixel circuit and first light emitting elements, wherein the first pixel circuit is electrically connected with M first light emitting elements which are connected in series, M and M is an integer, and the first pixel circuit comprises:

a driving module configured to drive the first light emitting elements to emit light; and at least one first switch module connected in parallel with N first light emitting elements, 1≤N<M and N being an integer, wherein the method comprises:

providing, under a condition that a brightness of the display panel is less than a preset brightness threshold, a turn-on level to a control terminal of at least one of the at least one first switch module, to cause the first light emitting elements connected in parallel therewith not to emit light.

13. The driving method according to claim 12, wherein the preset brightness threshold comprises a first brightness threshold and a second brightness threshold, and the first brightness threshold is greater than the second brightness threshold; and the first pixel circuit comprises a plurality of first switch modules which are connected in parallel with different first light emitting elements respectively, and wherein providing, under the condition that the brightness of the display panel is less than the preset brightness threshold, the turn-on level to the control terminal of at least one of the at least one first switch module particularly comprises:

providing, under a condition that the brightness of the display panel is less than the first brightness threshold and greater than or equal to the second brightness threshold, the turn-on level to the control terminals of x1 first switch modules in the first pixel circuit; and providing, under a condition that the brightness of the display panel is less than the second brightness threshold, the turn-on level to the control terminals of x2 first switch modules in the first pixel circuit, and x2>x1>0.

14. The driving method according to claim 12, wherein a control terminal of the first switch module is electrically connected with a first control signal line, the first light emitting elements comprise a first-color first light emitting element and a second-color first light emitting element, and the first switch module coupled with the first-color first light emitting element and the first switch module coupled with the second-color first light emitting element are connected with a same first control signal line, and wherein providing, under the condition that the brightness of the display panel is less than the preset brightness threshold value, the turn-on level to the control terminal of at least one of the at least one first switch module particularly comprises:

providing, under the condition that the brightness of the display panel is less than the preset brightness threshold, the turn-on level to the first control signal line, to cause the first-color first light emitting element and the second-color first light emitting element which are connected in parallel with the first switch modules not to emit light.

15. The driving method according to claim 12, wherein a control terminal of the first switch module is electrically connected with a first control signal line, the first light emitting elements comprise a first-color first light emitting element and a second-color first light emitting element, and the first switch module coupled with the first-color first light emitting element and the first switch module coupled with the second-color first light emitting element are connected with different first control signal lines, and wherein providing, under the condition that the brightness of the display panel is less than the preset brightness threshold value, the turn-on level to the control terminal of at least one of the at least one first switch module particularly comprises:

providing, under the condition that the brightness of the display panel is less than the preset brightness threshold, the turn-on level to the first control signal line corresponding to the first-color first light emitting element, and a turn-off level to the first control signal line corresponding to the second-color first light emitting element, to cause the first-color first light emitting element connected in parallel with the first switch module not to emit light, and cause the second-color first light emitting element connected in parallel with the first switch module to emit light.

16. A display apparatus comprising a display panel, wherein the display panel comprises a first pixel circuit and first light emitting elements, wherein the first pixel circuit is electrically connected with M first light emitting elements which are connected in series, M≥2 and M is an integer, and the first pixel circuit comprises:

a driving module configured to drive the first light emitting elements to emit light; and at least one first switch module connected in parallel with N first light emitting elements, 1≤N<M and N being an integer.

17. The display apparatus according to claim 16, wherein the first pixel circuit comprises a plurality of first switch modules which are connected in parallel with different first light emitting elements respectively;

under a condition that a brightness of the display panel is less than a first brightness threshold and greater than or equal to a second brightness threshold, x1 first switch modules in the first pixel circuit are turned on; and under a condition that the brightness of the display panel is less than the second brightness threshold, x2 first switch modules in the first pixel circuit are turned on, x2>x1>0, and each of x1 and x2 is an integer.

18. The display apparatus according to claim 16, wherein a control terminal of the first switch module is electrically connected with a first control signal line, a first terminal of the first switch module is electrically connected with a first electrode of a $1^{st}$ one of the N first light emitting elements, and a second terminal of the first switch module is electrically connected with a second electrode of a $N^{th}$ one of the N first light emitting elements.

19. The display apparatus according to claim 16, wherein the first light emitting elements comprise a first-sub first light emitting element and a second-sub first light emitting element which are coupled with a same first pixel circuit, the first-sub first light emitting element is connected in parallel with the first switch module, and the second-sub first light emitting element is connected in series with the first switch module, an emitting area of the first-sub first light emitting element is greater than or equal to an emitting area of the second-sub first light emitting element.

20. The display apparatus according to claim 16, wherein the first light emitting elements comprise a first-sub first light emitting element and a second-sub first light emitting element which are coupled with a same first pixel circuit, the first-sub first light emitting element comprises a first light emitting part, the second-sub first light emitting element comprises a second light emitting part, and the first light emitting part and the second light emitting part are arranged in staggered layers.

* * * * *